US006470444B1

United States Patent
Sheaffer

(10) Patent No.: US 6,470,444 B1
(45) Date of Patent: Oct. 22, 2002

(54) METHOD AND APPARATUS FOR DIVIDING A STORE OPERATION INTO PRE-FETCH AND STORE MICRO-OPERATIONS

(75) Inventor: Gad S. Sheaffer, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/334,361

(22) Filed: Jun. 16, 1999

(51) Int. Cl.$^7$ ................................................. G06F 9/38
(52) U.S. Cl. ...................... 712/217; 712/207; 712/230; 711/137; 711/203; 711/213
(58) Field of Search .............................. 712/216–217, 712/225, 207, 230; 711/137–213

(56) References Cited

U.S. PATENT DOCUMENTS

| | | | | |
|---|---|---|---|---|
| 5,170,476 A | * | 12/1992 | Laakso et al. .............. | 711/140 |
| 5,615,386 A | * | 3/1997 | Amerson et al. ........... | 712/238 |
| 5,778,423 A | * | 7/1998 | Sites et al. ................. | 711/118 |
| 5,845,101 A | * | 12/1998 | Johnson et al. ............ | 712/207 |
| 5,931,945 A | * | 8/1999 | Yung et al. ................. | 712/300 |
| 5,944,815 A | * | 8/1999 | Witt ............................ | 712/207 |

OTHER PUBLICATIONS

Stephen W. Melvin, et al., "Hardware Support for Large Atomic Units in Dynamically Scheduled Machines", Computer Science Division, University of California, Berkeley, 1998 IEEE, pp. 60–63.
Mark Smotherman, et al., "Improving CISC Instruction Decoding Performance Using a Fill Unit", Department. of Computer Science, Clemson University, Clemson SC, 1995 IEEE, pp. 219–229.

* cited by examiner

Primary Examiner—Richard L. Ellis
Assistant Examiner—Gautam R. Patel
(74) Attorney, Agent, or Firm—Blakely, Sokoloff, Taylor & Zafman LLP

(57) ABSTRACT

A method of performing a store operation in a computer processor is disclosed. The method issues a store operation that is divided into a pre-fetch micro-operation that loads a needed cache line into a cache memory, and the subsequent store micro-operation stores a data value into the needed cache line that was pre-fetched into the cache memory.

11 Claims, 3 Drawing Sheets

| MICRO-OP | OPERAND 1 | OPERAND 2 | DESTINATION |
|---|---|---|---|
| PRF | ADDRESS 1 | | |
| LOD | 27 | | R1 |
| ADD | R1 | R2 | R2 |
| STO | R2 | | ADDRESS 1 |
| LOD | ADDRESS 1 | | R0 |
| ADD | ADDRESS 1 | R4 | R4 |

| MICRO-OP | OPERAND 1 | OPERAND 2 | DESTINATION |
|---|---|---|---|
| STA | ADDRESS 1 | | |
| LOD | 27 | | R1 |
| ADD | R1 | R2 | R2 |
| STD | R2 | | |
| LOD | ADDRESS 1 | | R0 |
| ADD | ADDRESS 1 | R4 | R4 |

```
                LOAD      REG 1, #27              ; REG 1 <-- 27
BUBBLE          ADD       REG 2, REG 1            ; REG 2 <-- REG 1 + REG 2
  DUE           STORE     REG 2, ADDRESS 1        ; STORE REG 2 AT ADDRESS 1
TO CACHE        LOAD      REG 0, ADDRESS 1        ; LOAD REG 1 FROM ADDRESS 1
  MISS          ADD       REG 4, (ADDRESS 1)      ; REG 4 <-- (ADDRESS 1) + REG 4
```

FIG. 2
(PRIOR ART)

| MICRO-OP | OPERAND 1 | OPERAND 2 | DESTINATION |
|---|---|---|---|
| PRF | ADDRESS 1 | | |
| LOD | 27 | | R1 |
| ADD | R1 | R2 | R2 |
| STO | R2 | | ADDRESS 1 |
| LOD | ADDRESS 1 | | R0 |
| ADD | ADDRESS 1 | R4 | R4 |

FIG. 3

| MICRO-OP | OPERAND 1 | OPERAND 2 | DESTINATION |
|---|---|---|---|
| STA | ADDRESS 1 | | |
| LOD | 27 | | R1 |
| ADD | R1 | R2 | R2 |
| STD | R2 | | |
| LOD | ADDRESS 1 | | R0 |
| ADD | ADDRESS 1 | R4 | R4 |

FIG. 4

METHOD AND APPARATUS FOR DIVIDING A STORE OPERATION INTO PRE-FETCH AND STORE MICRO-OPERATIONS

FIELD OF THE INVENTION

The present invention relates to the field of computer processor architecture. In particular the present invention discloses a method and apparatus for improving memory operation efficiency by dividing memory write operations into a prefetch stage and store stage.

BACKGROUND OF THE INVENTION

Computer processor designers continually attempt to improve the performance of computer processors. To improve processor performance, many novel processor design approaches have been created such as pipeline execution, register renaming, out-of-order instruction execution, and branch prediction with speculative execution of instructions fetched after a predicted branch. However, the speed of computer memories has not increased proportionally with the speed increases of computer processors. To alleviate any speed bottleneck that may be caused by the relatively slow main memory, most processors use a local high-speed cache memory.

The speed of computer processors now often stretches the limitations of high-speed cache memories. In order to most efficiently utilize a local high-speed cache memory system, a processor must be carefully integrated the cache memory system using read buffers and write buffers. The read buffers and write buffers provide a conduit between processor execution units and the memory subsystems. If the design of the read buffers, write buffers, and the associated control logic is optimized then the computer processor will not be slowed down by the memory system. It would therefore be desirable to have an improved memory interface within a computer processor.

SUMMARY OF THE INVENTION

A method of performing memory write operations in a computer processor is disclosed. The method issues a prefetch operation that loads a needed cache line into a cache memory. Then, a subsequent store operation is issued. The subsequent store operation stores a data value into the cache line that was pre-fetched into the cache memory.

Other objects, features, and advantages of present invention will be apparent from the accompanying drawings and from the following detailed description that follows below.

BRIEF DESCRIPTION OF THE DRAWINGS

The objects, features, and advantages of the present invention will be apparent to one skilled in the art in view of the following detailed description in which:

FIG. 2 illustrates a short section of assembly code that may cause a bubble in a computer processor pipeline.

FIG. 3 illustrates a list of micro-operations generated by a first embodiment of the present invention.

FIG. 4 illustrates a list of micro-operations generated by a second embodiment of the present invention.

DETAILED DESCRIPTION OF THE PREFERRED EMBODIMENT

Figure 1:
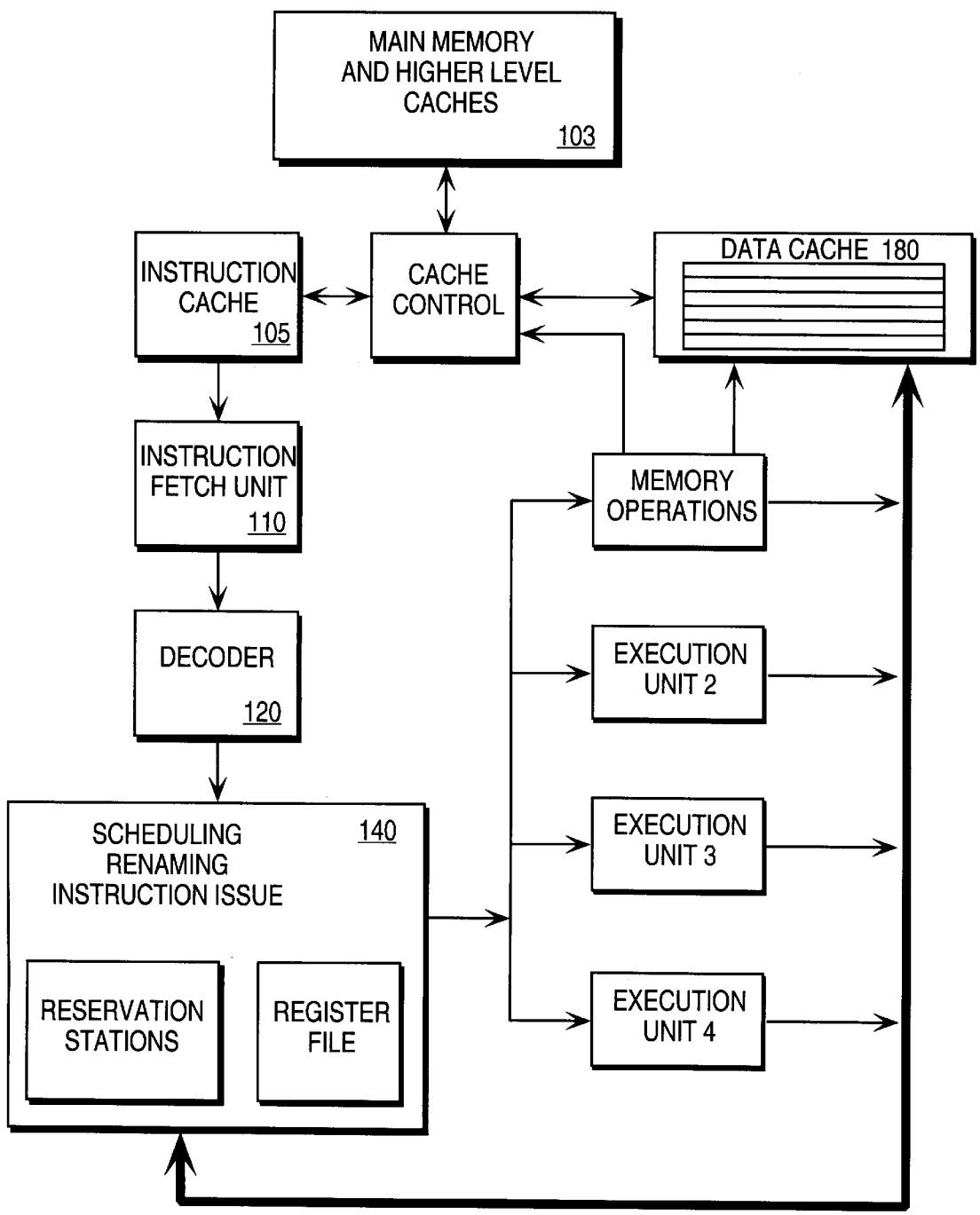
FIG. 1 illustrates a pipelined superscalar computer processor.

A method and apparatus for dividing memory write operations into a prefetch stage and store stage is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to a computer processor that has large instructions that are decoded into smaller micro-operations. However, the same techniques can easily be applied to other types of processors.

A Typical Prior Art Processor Architecture

FIG. 1 illustrates a prior art out-of-order superscalar computer processor. In the computer processor of FIG. 1, an instruction fetch unit 110 fetches instructions from a first level local instruction cache 105 or a main memory unit 103. If the desired instruction is in the first level local instruction cache 105, then the instruction fetch unit 110 fetches from that first level local instruction cache 105. Otherwise, the instruction fetch unit 110 must fetch the desired instruction from the slower main memory unit 103. (In some embodiments, a second level cache may be present to further improve memory access times.)

The fetched instructions are passed to a decoder 120 that decodes the fetched instructions. In one embodiment, the decoder decodes the computer processor instructions into one or more small simple micro-operations (micro-ops). The decoded micro-operations are then passed to a scheduling unit 140 that allocates resources, performs register renaming, and schedules micro-ops for issue into executions units. Register renaming is performed using a register file and register map. The micro-ops are stored in a reservation station unit execution. The scheduling unit 140 selects the micro-ops that will be executed at any given cycle of the processor.

The scheduled micro-ops are dispatched from the reservation stations along with operands from the register file to execution units for execution. In the processor embodiment of FIG. 1, there are four different execution units: a memory operation execution unit 150, execution unit 2, execution unit 3, and execution unit 4. The scheduling unit 140 dispatches micro-ops to the execution units by selecting data-ready micro-ops for which an appropriate execution unit is available. In most processors, the individual execution units are not identical such that each execution unit can only process certain types of instructions. For example, in FIG. 1, the memory operation execution unit 150 is configured only for performing memory operations.

Cache Memory Basics

The speed of modem computer processors greatly exceeds the speed of standard Dynamic Random Access Memory (DRAM). To compensate for this speed disparity, interleaved memory systems have been created. Interleaved memory systems divide memory operations among a number of different DRAM units in a manner that improves memory response times. However, the most commonly used technique to improve memory subsystem performance is to implement high-speed cache memory systems.

Cache memory systems are small high-speed memories that are tightly integrated with a computer processor. Cache memory systems replicate the function of a normal main memory except that cache memories respond much faster. Therefore, to improve processor performance a section of main memory that the processor is currently using is copied into a high-speed cache memory.

When the processor needs information that is currently stored within the high-speed cache memory (a cache "hit"), the high-speed cache memory quickly responds with the needed information. Due to the locality of most programs, a well designed cache memory system will greatly reduce the number of times that a processor needs to access the slower main memory. Thus, the overall memory system performance is greatly improved.

When a processor needs to access information in a memory that location is not currently replicated in the cache memory (a cache "miss"), the processor may need to wait for the main memory to respond with the desired information. Therefore cache memory systems are designed to minimize the number of cache misses greatly since cache misses greatly reduce processor performance.

Processor Stall Caused By A Cache Memory "Miss"

As illustrated in FIG. 1, a typical high-speed processor includes an integrated data cache memory unit 180. To obtain maximum performance from the data cache memory unit 180, the integrated data cache memory unit 180 must be loaded with the most relevant memory locations such that the best cache hit rate is achieved. To help achieve this goal, the present invention proposes dividing memory write operations into two stages: a cache line prefetch instruction and a memory write instruction. The cache line prefetch instruction and a memory write instruction do not need to be (and probably should not be) consecutive. The cache line prefetch instruction will alert the memory operation subsystem of an upcoming memory write instruction. In this manner, the processor will fetch the proper cache line into the integrated data cache memory unit 180. Thus, no cache "miss" will occur when the memory write instruction is later encountered.

FIG. 2 illustrates an example section of code wherein a cache miss can cause a stall in a processor pipeline. The code of FIG. 2 represents a generic fictional processor machine code using instructions similar to instructions that exist in most processors. Referring to the code of FIG. 2, the first instruction loads a first register (REG1) with an immediate data value. The next instruction adds REG1 to a second register (REG2) and stores the result in REG2. In the third instruction, the result in REG2 is stored into a memory location at an arbitrary address (Address1). The fourth instruction loads another register (REG0) with the data value that was stored in Address1. The fifth instruction adds the value at Address1 to yet another register (REG4).

The first two instructions of the code in FIG. 2 are easily executed with a processor stall since the first two instructions only access internal registers and an immediately available data value. However, the third instruction (the STORE instruction) accesses the external memory. To quickly access a memory location, a cache memory will likely be used. However, if the cache-line containing Address1 is not currently in the cache memory, then the STORE instruction will stall the processor since the cache line containing Address1 must be fetched. Even if the processor is capable of concurrently executing multiple instructions out of the original program order, the code of FIG. 2 will still cause a stall since the next two instructions are dependent on the data stored into Address1. Furthermore, the two instructions after the memory STORE instructions cannot be executed before the memory STORE instruction completes since those two instructions are dependent upon the value stored into Address1 by the memory STORE operation. Thus, the processor will be stalled until the cache line containing Address is fetched such that the memory STORE instruction can complete.

A Divided Memory Write Operation

In many processors, the processors instructions fetched by the processor are broken down into smaller simpler instructions. The smaller simpler instructions are thus executed to perform the operations of the larger more complex processor instructions. For example, referring back to FIG. 1, the decoder 120 decodes the fetched processor instructions and outputs one or more small simple micro-operations (micro-ops) codes for each processor instruction. The remainder of the instructions processing is performed by using the micro-ops.

A processor "store" instruction (store data value into a memory location) would normally be translated into a single micro-op since the task to be performed by the processor store instruction is relatively straightforward. However, the present invention contemplates dividing a processor store instruction into two separate micro-ops: a pre-fetch micro-op and a store micro-op. The pre-fetch micro-op alerts the memory subsystem that a particular cache line will be needed. In this manner, the memory subsystem will fetch the needed cache line. The store micro-op will perform the actual memory store operation. If the needed cache line is already in the cache, then the pre-fetch micro-op does not need to be issued.

FIG. 3 illustrates an example of how the divided memory write operation can improve processor performance. FIG. 3 illustrates an example of micro-ops issued in a super-scalar processor capable of concurrently executing instructions out of the original program order to perform the processor instructions of FIG. 2. Referring to FIG. 3, the first micro-op issued is a prefetch (PRF) micro-op that alerts the memory subsystem of an upcoming memory operation that will affect Address1. The next two micro-ops (LOD and ADD) perform the functions of the first two processor instructions (LOAD and ADD) of FIG. 2. The fourth micro-op is a memory store (STO) micro-op that stores the value of the second register (R2) into Address1. Since the pre-fetch micro-op had already issued, the cache line containing Address1 will be available such that the memory store micro-op will not stall the processor pipeline. The last two micro-ops of FIG. 3 perform the function of the last two computer processor instructions of FIG. 2.

FIG. 4 illustrates another example micro-op flow using a second embodiment of a divided memory write operation. In the example of FIG. 4, the embodiment features a memory write operation that is divided into a store address (STA) micro-op and a store data (STD) micro-op.

The store address micro-op (STA) performs several preliminary functions required for the memory store operation. For example, the store address micro-op (STA) may perform memory-addressing calculations such as calculating the needed physical memory address from a virtual memory address. The store address micro-op (STA) may also perform memory system violation checks such as segment violation checks). This implementation is desirable in processor architectures with complex memory addressing systems that require difficult memory address calculations and memory system violation determinations. The primary goal of the store address micro-op (STA) is to prefetch the cache line that contain the needed memory address.

After the store address micro-op (STA) has issued, the store data micro-op (STD) may issue. The store data micro-op (STD) stores the data in the memory address that was identified in the previously issued store address (STA) micro-op.

Referring to FIG. 4, the first micro-op issued in the second embodiment example is a store address micro-op (STA) that first calculates a desired memory address, performs memory violation checks, and alerts the memory subsystem of an upcoming memory operation that will affect the desired memory address. The next two micro-ops (LOD and ADD) perform the functions of the first two computer processor instructions (LOAD and ADD) in the code of FIG. 2. The fourth micro-op is a store data (STD) micro-op that stores the value of the second register (R2) into the address specified by the previously issued store address (STA) micro-op. In this example, the previously issued store address (STA) micro-op generated the address Address1. Since the store address micro-op (STA) had already issued, the cache line containing generated address Address1 will be available such that the store data (STD) micro-op will not stall the processor pipeline. The last two micro-ops of FIG. 4 perform the function of the last two computer processor instructions of FIG. 2.

The foregoing has described a method and apparatus for dividing memory write operations into a prefetch stage and store stage. It is contemplated that changes and modifications may be made by one of ordinary skill in the art, to the materials and arrangements of elements of the present invention without departing from the scope of the invention.

I claim:

1. An apparatus for processing computer instructions, said apparatus comprising:
    a memory subsystem, said memory subsystem for handling cache and memory operations;
    a decoder, the decoder decoding a store operation into a pre-fetch micro-operation and a store operation; the pre-fetch micro-operation loading a needed cache line into a cache, and the subsequent store micro-operation storing a data value into the needed cache line into the cache;
    at least one execution unit, said execution unit for processing operations; and an out-of-order scheduler, said scheduler for scheduling the pre-fetch micro-operation and the store micro-operation out of an original program order.

2. The apparatus as claimed in claim 1 wherein said pre-fetch micro-operation designates a desired memory address, said desired memory address within an address space of said needed cache line.

3. The apparatus as claimed in claim 2 wherein said desired memory address comprises a virtual memory address.

4. The apparatus as claimed in claim 3 wherein said pre-fetch micro-operation calculates a physical memory address from said virtual memory address.

5. The apparatus as claimed in claim 4 wherein said pre-fetch micro-operation performs memory system violation checks.

6. The apparatus as claimed in claim 4 wherein said out-of-order scheduler schedules intermediate instructions between said pre-fetch micro-operation and said store micro-operation.

7. A method comprising:
    handling cache and memory operations via a memory subsystem;
    decoding a store operation into a pre-fetch micro-operation and a store operation;
    the pre-fetch micro-operation loading a needed cache line into a cache;
    the store micro-operation storing a data value into the needed cache line into the cache; and
    an out-of-order scheduler scheduling the pre-fetch micro-operation and the store micro-operation out of an original program order.

8. The method as claimed in claim 7 wherein said desired memory address comprises a virtual memory address.

9. The method as claimed in claim 8 wherein the pre-fetch micro-operation includes calculating a physical memory address from the virtual memory address.

10. The method as claimed in claim 9 wherein the pre-fetch micro-operation includes performing memory system violation checks.

11. The method as claimed in claim 7 wherein the pre-fetch micro-operation includes designating a desired memory address, said desired memory address within an address space of the needed cache line.

* * * * *

UNITED STATES PATENT AND TRADEMARK OFFICE
CERTIFICATE OF CORRECTION

PATENT NO. : 6,470,444 B1  Page 1 of 1
DATED : October 22, 2002
INVENTOR(S) : Sheaffer It is certified that error appears in the above-identified patent and that said Letters Patent is hereby corrected as shown below:

Column 2,
Line 52, delete "modem", insert -- modern --.

Signed and Sealed this

Twenty-second Day of June, 2004

JON W. DUDAS
*Acting Director of the United States Patent and Trademark Office*